Oct. 26, 1965    R. S. MOORE ET AL    3,214,383
PROCESS FOR INCORPORATING PHOSPHORESCENT TRIPLET
STATE ORGANIC COMPOUNDS IN PLASTIC MEDIA
Filed Sept. 26, 1962
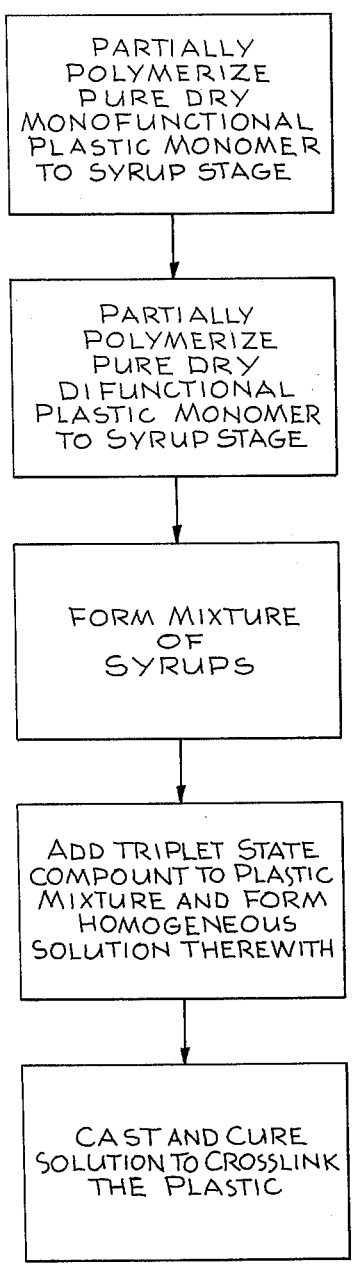
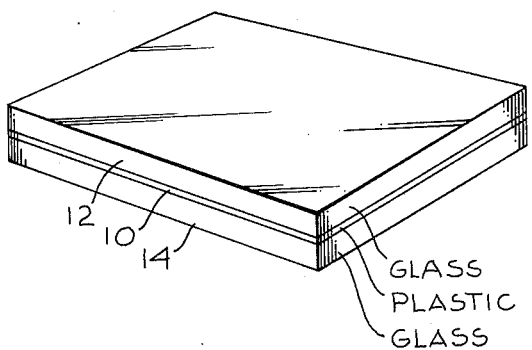
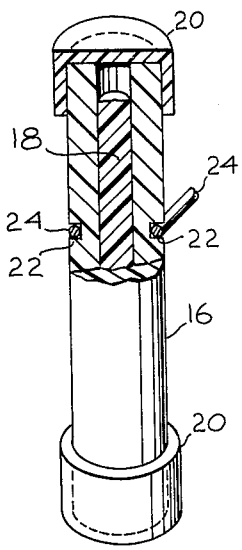
RICHARD S. MOORE
MAURICE W. WINDSOR
INVENTORS
BY Jerry A. Dinardo
AGENT United States Patent Office 3,214,383
Patented Oct. 26, 1965

3,214,383
PROCESS FOR INCORPORATING PHOSPHORESCENT TRIPLET STATE ORGANIC COMPOUNDS IN PLASTIC MEDIA
Richard S. Moore, Los Angeles, and Maurice W. Windsor, Redondo Beach, Calif., assignors, by mesne assignments, to TRW Inc., a corporation of Ohio
Filed Sept. 26, 1962, Ser. No. 226,347
7 Claims. (Cl. 252—301.2)

This invention relates to the production of phosphorescence in triplet-state organic compounds, and more particularly to improvements designed to enhance the spectral purity of the phosphorescence from such compounds that are incorporated in plastic media.

Many organic compounds exhibit phosphorescence and photochromism under certain preferred conditions, e.g., when incorporated into rigid glassy media such as boric acid, sugar, or into frozen solutions at low temperatures (liquid nitrogen temperature, 77° K.). These organic compounds, which are said to exhibit triplet state effects, will be referred to herein as triplet state organic compounds.

When these organic compounds are irradiated with light, many of the molecules are raised from the lower singlet or ground state to an upper singlet state. The upper singlet state is an unstable state. Some of the molecules descend to an intermediate state called the lowest triplet state. This intermediate state is metastable and under favorable circumstances can exhibit a long lifetime, often of the order of seconds (almost always in the range of from $10^{-4}$ to $10^{+2}$ seconds). Because of this long life it is often possible to convert temporarily a sizable fraction of the original molecules to the lowest triplet state. If radiation is emitted by molecules making a transition from the lowest triplet state to the ground state, the radiation energy appears as phosphorescence (a long-lived luminescent afterglow). In addition, radiation can be absorbed by molecules in the lowest triplet state, the molecules making a transition to a still higher triplet state. Since this radiation may be different in wavelength from that absorbed by the parent molecule, a photochromic effect may be exhibited.

The media heretofore used for triplet state compounds are not satisfactory for many purposes because of their poor optical quality. For example, both boric acid and sucrose are hygroscopic, i.e., they absorb atmospheric moisture. This leads to opacity of the sample. Also, over long periods of time, crystallization may occur with a similar result. Furthermore, such vehicles are not easily worked mechanically. For many purposes, a clear plastic medium would be advantageous.

In concurrently filed copending application of Maurice W. Windsor, Serial No. 226,265, there is disclosed a method of incorporating organic compounds in plastic media in such a way that the compounds exhibit long-lived triplet state effects. That method involves cross-linking the long polymer chains of suitable plastics to produce a microscopically rigid environment for the organic compounds. The necessary cross-linking of the plastic is achieved by partially polymerizing a plastic monomer, through the application of heat and with the aid of a catalyst, to produce a syrup, adding the organic compound, either alone or with another catalyst, to the syrup to form a solution, and heating the solution to cross link the plastic to the necessary degree to achieve the desired triplet state effects.

While the aforementioned method does produce a plastic matrix of the required microrigidity, it has been found that the presence of the various catalysts tends to detract from the spectral purity of the phosphorescence. Further, the optical quality of the finished matrix is rather difficult to control, and unwanted chemical side reactions are sometimes encountered.

While in some applications, the presence in the finished article of extraneous spectra and colors, other than those expected from the organic triplet state compound present, is not objectionable, such extraneous spectra limit the usefulness of the organic phosphorescent device in certain refined spectroscopic equipment.

Accordingly, an object of this invention is to provide an improved method of incorporating phosphorescent organic compounds in plastic media, whereby the spectral purity of the resultant article is enhanced.

A further object is to eliminate extraneous spectral effects from phosphorescent articles of the kind in which a triplet state compound is in solid solution with a microscopically rigid plastic.

According to the invention, a pure, dry, monofunctional monomer, that is, one from which inhibitors and extraneous water have been removed, and a pure, dry, difunctional monomer are partially polymerized, separately, to the syrup stage solely by the application of ultraviolet light and heat, without the provision of any catalyst. The two individually partially polymerized syrups are then combined with an appropriate triplet state compound to form a homogeneous solution. The homogeneous solution, which may then be cast in a suitable mold of desired shape, is thereafter cured by the application of heat alone, without the aid of a catalyst, to further polymerize and cross link the plastic, the solution solidifying into the desired shape. The cross-linking is carried out to the extent necessary to constrain the molecules of the triplet state compound sufficiently on the microscopic scale to permit them to phosphoresce, but not to the extent of destroying the transparency of the plastic medium. The spectral purity of the resultant phosphorescent article is found to be enhanced by the elimination of catalyst and other sources of contamination.

In the drawing:
FIG. 1 is a flow sheet diagram illustrating the method of the invention.
FIG. 2 is a perspective view showing an article made according to the method of the invention, and
FIG. 3 is a sectional view illustrating an arrangement for casting a plastic-dissolved, triplet state compound in cylindrical form.

The invention will now be described in conjunction with several examples, reference being had to the flow sheet diagram of FIG. 1 for the order in which the various steps are carried out.

*Example 1*

A batch of monomeric methylmethacrylate, a monofunctional acrylic compound, was purified and dried to remove all traces of inhibitor and extraneous water. The pure, dry monomer was then partially polymerized to the syrup stage by exposing it to ultraviolet light and infrared radiation from a 275-watt sun lamp at a distance of 5 inches for about 30 minutes with periodic stirring, until a hot viscosity of about 3 poises was achieved. The viscosity was measured by the Gardner bubble viscometric method, which is fully disclosed in the journal of the "American Society of Testing Materials, specification number D154-56." The ultraviolet light output of the sun lamp was used to induce the cross-linking polymerization process. The portion of infrared radiation emitted by the lamp served to accelerate the over-all cross-linking and linear polymerization, causing the syrup to heat to about 100–110° C.

Next, a batch of ethyleneglycoldimethacrylate, a difunctional acrylic compound, was purified, dried and partially polymerized in the same manner. The two syrups were combined together in the ratio of 3 milliliters of ethyleneglycoldimethacrylate to 50 milliliters of methylmethacrylate.

To 50 milliliters of the mixed syrup was added 55 milligrams of chrysene, a triplet state compound selected from the class of condensed ring polynuclear aromatic hydrocarbons, and a homogeneous, optically clear, viscous solution was formed by stirring the constituents. The viscous solution was cast in cylindrical molds, which were capped at the ends to prevent the continued gross exposure to oxygen. The samples were cured by heating them in an oven at 45–55° C. for 7 days and then heating them at 125–130° C. for 2 hours. The samples were then annealed by cooling them slowly to room temperature over a period of from 12 to 16 hours.

The resultant product was a clear, transparent rod having gross dimensions of 1 cm. x 20 cms., with an unobstructed optical path of the same dimensions.

When the rod was irradiated with light from a sun lamp emitting ultraviolet and visible light, the color of the rod in transmission as viewed end-on against a white background was seen to change from water-white to reddish-purple. This phenomenon can be explained as follows. Irradiation by ultraviolet light transfers a sizable fraction of the molecules to the lowest triplet state. The reddish-purple transmitted color arises from the absorption by the triplet state molecules of the blue-green and yellow portions of the visible spectrum and demonstrates the photochromic property of the organic compound. Since transitions from the lowest triplet state take place to higher triplet levels, this type of photochromism is sometimes called triplet-triplet absorption. When viewed against a black background, a blue emission was observed from the rod. This is the normal singlet-singlet fluorescence and is detectable only while the exciting light is on. In contrast, the reddish-purple, triplet-triplet absorption can be observed for several seconds after the exciting light has been extinguished.

When the lamp was extinguished, the rod was seen to emit a yellow-green afterglow, indicating phosphorescence of triplet state molecules. These effects were observed at room temperature.

*Example 2*

Fifty milliliters of mixed syrup prepared as in Example 1 was mixed with 6 milligrams of naphthalene. The solutions were cast, cured, and annealed in the same way. When the product was exposed to a sun lamp, it displayed blue fluorescence and green phosphorescence at room temperature.

*Example 3*

Fifty milliliters of mixed syrup prepared as in Example 1 was mixed with 57 milligrams of chrysene. The solution was cast in a cylindrical pressure mold. With the pressure mold maintained at 6 atmospheres of pressure, the sample was cured at 125° C. for 14 hours and then annealed to room temperature. When the product was exposed to a sun lamp, it displayed blue fluorescence and red triplet-triplet absorption, and yellow-green phosphorescence at room temperature.

The following procedure describes a method which can be used to remove hydroquinone or phenol type inhibitors and water from the plastic monomer. Initial removal of the inhibitor was accomplished by extraction with a 10% by volume aqueous solution containing 5% sodium hydroxide and 20% sodium chloride. Three or more extractions of 10 minutes each were made until the alkali solution was water-white. Extraction was then made using a 20% aqueous solution of sodium chloride until the extractate was neutral. Extraction by distilled water was then made until the extractate showed no turbidity with a concentrated aqueous solution of silver nitrate. The monomer was then dried over excess anhydrous sodium carbonate for 16 hours. After drying, the monomer was chromatographed through a 1" x 24" column of activated silica gel.

In practicing the method of the invention, it will be found desirable to exercise some degree of control over several of the parameters involved. In the first place, it is important to control the viscosity of the partially polymerized syrup. The number of cross-linking sites activated is a function of the rapidity of attainment of the high viscosity, as controlled by the intensity of the ultraviolet and infrared irradiation. Thus, to insure the establishment of a sufficient number of cross-linking sites which will in the curing process result in a sufficiently high degree of cross-linking, it is important that the intensity of the ultraviolet light irradiation be sufficient to cause the plastic to reach the desired viscous state. In the examples described, a viscosity of 1 to 8 poises is preferably attained. If the viscosity is much higher than this, the homogeneous incorporation of the triplet state compound becomes more difficult. Satisfactory results will be obtained if the viscosity is maintained in the range of 1 to 8 poises.

In addition, it is necessary to limit the maximum concentration of the triplet state compound to that amount which will not exceed its solubility in the plastic medium used. Otherwise, a suspension will form instead of a true solution. Further, when thermal curing is done at atmospheric pressure, the temperature at which the initial stages of thermal curing is carried out must be low enough to prevent both the growth of the polymerization exotherm and the decomposition of any unstable triplet state compound used. If the polymerization exotherm of the polymerization reaction is permitted to become self-sustaining, it is found that the solution will tend to bubble, thereby causing the product to be filled with voids. Therefore, it has been found practicable to carry out the initial stages of the curing process at a mild temperature over a long period of time to cause sufficient solidification of the solution to be achieved, so that bubbling can not thereafter occur. Then the solidified solution can be safely heated to a higher temperature to produce sufficient cross-linking in the plastic to hold the triplet state molecules rigid.

On the other hand, when the solution is maintained under pressure, curing can be achieved more rapidly and at higher temperature without danger of bubbling. However, in either case, the degree of cross-linking must not be so high as to produce opaqueness in the plastic medium. It has been found that satisfactory results will be attained if the cross-linking is held to levels represented by 50% to 75% gel content in the finished product. The gel content is determined by measuring the weight percent of plastic dissolved after 5 hours' immersion in refluxing toluene.

Prior art methods of normal polymerization and cross-linking polymerization which depend upon the use of catalysts, such as organic peroxides and benzophenone, involve systems in which it is rather difficult to consistently achieve sufficient cross-linking under mild conditions of temperature and pressure, for example 50° C. and atmospheric pressure. Unless sufficient cross-linking is achieved, the triplet state compound will not exhibit the desired properties. In addition, the polymerization exotherm is more difficult to control, so that the resulting product contains many voids which block the optical path. Furthermore, the presence of these catalysts gives rise to a spectral impurity in the absorption characteristics of the triplet state compound and to an extraneous phosphorescence due to the catalysts or their reaction products.

In contrast, the catalyst-free method of this invention consistently produces sufficient cross-linking of the plastic medium under mild conditions to endow the product with the desired properties. The resultant product is one which is free from voids which obstruct the optical path and one in which all observed spectral absorption characteristics and phosphorescence are those attributed solely to the triplet state compound and to the natural low level phosphorescence of the plastic matrix.

FIG. 2 shows one form of a device incorporating a triplet state organic compound in solid solution with a clear plastic. In this embodiment the organic compound is combined with plastic in the form of a thin solid sheet 10 sealed between two glass plates 12 and 14. Such a device may serve as a phosphorescent window, the two glass plates 12 and 14 serving as protection for the plastic sheet 10 when used in environments where mechanical or chemical damage might otherwise ensue.

For use in environments where no protective elements are needed, the plastic may be cast in any desired shape. In FIG. 3, for example, the solution containing the partially polymerized plastic and the triplet state organic compound may be poured into a mold 16, shown as being cylindrical in form. The solution is then cured in the mold 16 in the manner described above to form a plastic rod 18. Advantageously, the mold 16 is fabricated from a material that is not wettable by the plastic, such as Teflon (polytetrafluoroethylene), so that the plastic rod 18 is readily removable from the mold 16 after curing and formed into a smooth surface.

In the example shown, the mold 16 is provided with tight fitting closure caps 20 at both ends, which are removed after curing to permit the plastic rod to be pushed out of the mold 16. The mold 16 is also provided with notches 22 to accommodate support members 24 which hold the mold 16 vertically.

The embodiments of the invention in which an exclusive property or privilege is claimed are defined as follows:

1. The method of manufacturing an article consisting essentially of a triplet state organic compound in solid solution with a transparent cross-linked plastic having a monofunctional component and a difunctional component, said method comprising:
    partially polymerizing a pure, dry monofunctional plastic monomer of methylmethacrylate to a syrup,
    partially polymerizing a pure, dry, difunctional plastic monomer of ethyleneglycoldimethacrylate to a syrup,
    forming a mixture of said syrups,
    introducing a triplet state organic compound selected from the group consisting of chrysene and naphthalene into said syrup mixture to form a homogeneous solution,
    and curing said solution to further polymerize and cross link said plastic to a degree below that which causes said plastic to lose its transparency,
    said partial polymerizing step being effected solely by the application of ultraviolet light and heat.

2. The invention according to claim 1, wherein each of said monofunctional and difunctional monomers is polymerized to a syrup having a viscosity in the range of about one to eight poises.

3. The invention according to claim 1, wherein said curing step is carried out to cross link said plastic to a level represented by 50 to 75% gel content in the finished article.

4. The invention according to claim 1, wherein said curing step is effected solely through the application of heat.

5. The invention according to claim 1, wherein each of said monofunctional and difunctional monomers is partially polymerized by simultaneously irradiating it with ultraviolet light while heating it to a temperature of 100–110° C. for about 30 minutes.

6. The invention according to claim 5, wherein said curing step is performed by subjecting said solution solely to pressure and heat.

7. The invention according to claim 5, wherein each of said monofunctional and difunctional monomers is partially polymerized to a syrup having a viscosity in the range of about one to eight poises, and said homogeneous solution is cured to cross link said plastic to a level represented by about 50 to 75% gel content in the finished article.

References Cited by the Examiner

UNITED STATES PATENTS 2,650,309  8/53  Webb et al. _____ 252—301.3

OTHER REFERENCES

Horn, "Acrylic Resins," Reinhold Pub. Corp., New York, 1960, page 2.

TOBIAS E. LEVOW, *Primary Examiner.*

MAURICE A. BRINDISI, *Examiner.*